(12) United States Patent
Downs, Jr. et al.

(10) Patent No.: US 12,122,248 B2
(45) Date of Patent: Oct. 22, 2024

(54) INTELLIGENT VEHICLES AND CONTROL LOGIC FOR MANAGING FAULTS FOR DUAL-INDEPENDENT DRIVE UNIT AXLE POWERTRAINS

(71) Applicant: GM GLOBAL TECHNOLOGY OPERATIONS LLC, Detroit, MI (US)

(72) Inventors: Aubrey W. Downs, Jr., Brighton, MI (US); Christopher L Jones, Ann Arbor, MI (US); James M. Faucett, Commerce, MI (US); Yiran Hu, Shelby Township, MI (US); Ruixing Long, Windsor (CA); Brent S. Gagas, Pleasant Ridge, MI (US); Wei Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 892 days.

(21) Appl. No.: 17/201,536

(22) Filed: Mar. 15, 2021

(65) Prior Publication Data

US 2022/0289044 A1    Sep. 15, 2022

(51) Int. Cl.
  *B60L 15/36*   (2006.01)
  *B60L 15/20*   (2006.01)
  (Continued)

(52) U.S. Cl.
  CPC .......... *B60L 15/36* (2013.01); *B60L 15/2036* (2013.01); *B60W 50/0205* (2013.01);
  (Continued)

(58) Field of Classification Search
  CPC .. B60L 15/36; B60L 15/2036; B60L 2240/12; B60L 2240/22; B60L 2240/423;
  (Continued)

(56) References Cited

U.S. PATENT DOCUMENTS 6,356,838 B1   3/2002   Paul
6,697,730 B2   2/2004   Dickerson
(Continued)

FOREIGN PATENT DOCUMENTS

DE   102014016567 A1   5/2016
DE   102019103559 A1 * 8/2020   .......... B60L 15/2054
EP   2610836 A1   7/2013

OTHER PUBLICATIONS

Machine translation of DE102019103559 (Year: 2020).*
(Continued)

*Primary Examiner* — Jacob S. Scott
*Assistant Examiner* — Michael E Butler
(74) *Attorney, Agent, or Firm* — Quinn IP Law

(57) ABSTRACT

Presented are control systems for operating dual-independent drive unit (DIDU) powertrains, methods for making/operating such systems, and electric-drive vehicles with fault management and mitigation for DIDU axles. A method of operating a motor vehicle with a DIDU axle includes monitoring first and second drive units (DU) that are independently operable to drive respective road wheels via respective axle shafts of the DIDU axle. A vehicle controller receives an indication of a fault condition in the first DU from a fault sensing module and responsively determines a fault type for the fault condition. The controller ascertains the vehicle's current speed and determines a respective torque limit for each of the DIDU drive units based on the fault type and current vehicle speed. Torque output of the first DU is concomitantly constrained to a first torque limit while torque output of the second DU is constrained to a second torque limit.

20 Claims, 2 Drawing Sheets

(51) Int. Cl.
  *B60W 50/02* (2012.01)
  *B60W 50/029* (2012.01)
(52) U.S. Cl.
  CPC ........ *B60W 50/029* (2013.01); *B60L 2240/12* (2013.01); *B60L 2240/22* (2013.01); *B60L 2240/423* (2013.01); *B60W 2050/0292* (2013.01)
(58) Field of Classification Search
  CPC ........... B60W 50/0205; B60W 50/029; B60W 2050/0292
  USPC .......................................................... 701/22
  See application file for complete search history.

(56) References Cited

U.S. PATENT DOCUMENTS

| | | |
|---|---|---|
| 7,266,438 B2 | 9/2007 | Kellum et al. |
| 7,589,643 B2 | 9/2009 | Dagci et al. |
| 7,739,036 B2 | 6/2010 | Grimm et al. |
| 7,840,427 B2 | 11/2010 | O'Sullivan |
| 8,050,855 B2 | 11/2011 | Coy et al. |
| 8,170,739 B2 | 5/2012 | Lee |
| 8,384,532 B2 | 2/2013 | Szczerba et al. |
| 8,428,843 B2 | 4/2013 | Lee et al. |
| 8,605,011 B2 | 12/2013 | Seder et al. |
| 8,612,139 B2 | 12/2013 | Wang et al. |
| 8,633,979 B2 | 1/2014 | Szczerba et al. |
| 8,692,739 B2 | 4/2014 | Mathieu et al. |
| 8,818,708 B2 | 8/2014 | Mathieu et al. |
| 8,849,515 B2 | 9/2014 | Moshchuk et al. |
| 8,996,273 B2 | 3/2015 | Lee et al. |
| 9,014,915 B2 | 4/2015 | Chatterjee et al. |
| 9,099,006 B2 | 8/2015 | Mudalige et al. |
| 9,229,453 B1 | 1/2016 | Lee |
| 9,238,412 B2 | 1/2016 | Kidston et al. |
| 9,267,810 B2 | 2/2016 | Pritchard |
| 9,283,967 B2 | 3/2016 | Lee |
| 9,443,429 B2 | 9/2016 | Mathieu et al. |
| 9,487,212 B1 | 11/2016 | Adam et al. |
| 9,809,130 B2 | 11/2017 | Heisel et al. |
| 9,868,443 B2 | 1/2018 | Zeng et al. |
| 9,931,963 B2 | 4/2018 | Heisel et al. |
| 10,005,363 B1 | 6/2018 | Correia et al. |
| 10,227,021 B2 | 3/2019 | Lor et al. |
| 10,259,341 B2 | 4/2019 | Lor et al. |
| 10,556,587 B2 | 2/2020 | Michaluk |
| 11,014,550 B2* | 5/2021 | Siokos .................. B60W 10/06 |
| 11,371,602 B1* | 6/2022 | Bruns .................... F16H 59/46 |
| 2009/0030885 A1 | 1/2009 | DePasquale et al. |
| 2010/0228415 A1 | 9/2010 | Paul |
| 2010/0332094 A1* | 12/2010 | Wu .................... B60K 23/0808 |
| | | 701/69 |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar et al. |
| 2014/0011522 A1 | 1/2014 | Lin et al. |
| 2014/0335995 A1 | 11/2014 | Swales et al. |
| 2015/0077270 A1 | 3/2015 | Rubin et al. |
| 2015/0353082 A1 | 12/2015 | Lee et al. |
| 2015/0353085 A1 | 12/2015 | Lee |
| 2016/0102986 A1 | 4/2016 | Ma et al. |
| 2016/0231124 A1 | 8/2016 | Nickolaou et al. |
| 2016/0260328 A1 | 9/2016 | Mishra et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Yimin et al. |
| 2017/0021830 A1 | 1/2017 | Feldman et al. |
| 2017/0136916 A1 | 5/2017 | Heisel et al. |
| 2017/0316684 A1 | 11/2017 | Jammoussi et al. |
| 2018/0257660 A1 | 9/2018 | Ibrahim et al. |
| 2018/0364700 A1 | 12/2018 | Liu et al. |
| 2018/0374341 A1 | 12/2018 | Branson et al. |
| 2019/0369626 A1 | 12/2019 | Lui et al. |
| 2019/0378412 A1 | 12/2019 | Zhu |
| 2022/0194378 A1* | 6/2022 | Sullivan .................... B60L 7/24 |

OTHER PUBLICATIONS

Min-Joong Kim, et al., "Method and Apparatus for Controlling a Multi-Mode Powertrain System of a Vehicle", U.S. Appl. No. 17/034,445, filed Sep. 28, 2020, 34 pages.

* cited by examiner

INTELLIGENT VEHICLES AND CONTROL LOGIC FOR MANAGING FAULTS FOR DUAL-INDEPENDENT DRIVE UNIT AXLE POWERTRAINS

INTRODUCTION

The present disclosure relates generally to powertrain systems for electric-drive vehicles. More specifically, aspects of this disclosure relate to fault management and mitigation for electric-drive powertrains with dual-independent drive unit axles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles (collectively "electric-drive vehicles"), on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Vehicle powertrains are predominantly available in four standard architectures: front-wheel drive (FWD), rear-wheel drive (RWD), four-wheel drive (4WD), and all-wheel drive (AWD) layouts. As the names imply, the prime mover in an FWD powertrain layout drives only the front two road wheels of a two-axle vehicle, whereas the prime mover in an RWD layout drives only the rear road wheels. Comparatively, 4WD layouts—including full-time and on-demand variants—are equipped with a transfer case that is controlled by a vehicle operator or powertrain control module (PCM) to selectively transfer torque from the prime mover to both forward and rear axles. Generally speaking, 4WD powertrain systems transmit equal amounts of tractive power to both the front and rear axles. Similar to 4WD architectures, an AWD powertrain layout transmits drive torque to all four of the vehicle's road wheels. Unlike on-demand 4WD, however, conventional AWD vehicles power all four wheels at all times during in-gear vehicle motion and, unlike full-time 4WD, AWD vehicles frequently transfer torque to the vehicle axles in unequal proportions.

With the introduction of HEV drive systems, select AWD powertrains may now utilize a transverse-mounted engine and transaxle assembly for transferring drive torque to a primary (front) driveline and, when all-wheel drive is desired, an aft-mounted traction motor for delivering drive torque to a secondary (rear) driveline. In lieu of longitudinally mounted engine arrangements with low-range-gear transfer cases of traditional 4WD vehicles, an HEV AWD layout may implement a power take-off unit (PTU) for selectively connecting the engine and transmission to both the front and rear drivelines. To eliminate inefficiencies associated with driveshafts, PTUs, and transfer cases, some AWD powertrains of electric-drive vehicles may take on a front-and-rear independent drive (FRID) configuration to provide optimized traction, e.g., for off-road driving conditions and during vehicle operation in inclement weather. An FRID-type powertrain utilizes a transverse-mounted engine or a front-mounted electric drive unit (EDU) for delivering drive torque to the front driveline and a discrete secondary EDU for independently delivering drive torque to the rear driveline. More recently, some battery electric vehicle (BEV) powertrains now implement an all-electric FRID powertrain layout with a dual-independent drive unit (DIDU) axle. Such FRID DIDU layouts employ at least three discrete prime movers, each of which is independently operable for delivering drive torque to a respective axle or axle half shaft.

SUMMARY

Presented herein are closed-loop feedback control systems with attendant control logic for operating DIDU powertrains, methods for making and methods for operating such systems, and intelligent electric-drive vehicles with fault management and mitigation for FRID DIDU axles. By way of example, DIDU powertrain control techniques provision axle fault management in vehicles with two discrete drive units (DU) independently driving respective half shafts of the same axle. Powertrain system control may instantaneously react to a detected hardware (HW) or communications (comms) fault by coordinating axle torque limits between a faulted DU and a non-faulted DU and, optionally, between the faulted axle and non-faulted axle. In tandem with axle torque coordination, the control system may impose an overall vehicle speed limit, enable electronic stability control (ESC), and change lateral control priorities within a resident electronic vehicle motion controller (VMC). Fault management and mitigation control strategies may be modulated, in real-time, as a function of vehicle speed, selected driving mode, and/or other dynamic vehicle operating states. Five simultaneous actions may be taken to manage a fault condition: (1) faulted axle torque limits are clamped to zero or an expected achievable torque on the faulted DU to ensure accurate prediction of resultant vehicle dynamics from the failure; (2) opposing axle torque limits are clamped to zero or a fault-dependent value based, for example, on a current driving mode, vehicle speed, and type of fault; (3) an overall vehicle speed limit is derived as a function of driving mode and fault type to prevent the vehicle from entering unwanted left-right torque vectoring; (4) calibrated values of the VMC are changed to either prioritize or de-prioritize lateral vehicle motion objectives depending on driver mode and type of fault; and (5) ESC is enabled depending on fault and driver mode.

Attendant benefits for at least some of the disclosed concepts include DIDU electric-drive vehicles with improved vehicle performance by mitigating unintended vehicle lateral motion (e.g., unintended yaw) resulting from failed axle operation due to a faulted half-shaft DU. Disclosed control schemes may also help to maximize vehicle usage by allowing limited drive torque transfer from the non-faulted DU(s) in predefined conditions to preclude scenarios in which the vehicle is rendered immovable. In addition to the foregoing advantages, disclosed features may also help to enhance vehicle drivability, improve powertrain control and response time, and optimize low-mu and off-road driving maneuvers.

Aspects of this disclosure are directed to system control logic, closed-loop feedback control techniques, and computer-readable media (CRM) for fault management and mitigation in DIDU powertrain layouts. In an example, a method is presented for operating a motor vehicle, including HEV and FEV-powertrain configurations, with one or more DIDU axles. This representative method includes, in any order and in any combination with any of the above and below disclosed options and features: monitoring, e.g., via a distributed sensor array and a motor control processor (MCP), first and second drive units (DU) independently operable to drive respective road wheels of the motor vehicle via respective axle shafts of the DIDU axle; receiving, e.g., via a resident or remote vehicle controller from a fault sensing module contained within the MCP, a fault signal indicating a fault condition in the first DU of the DIDU axle; determining, via the vehicle controller, a fault type (e.g., HW or comms fault in the DU motor, MCP, or power inverter) for the fault condition; determining, e.g., via the vehicle controller communicating with one or more wheel speed sensors, a real-time or near real-time current vehicle speed of the motor vehicle; determining, via the vehicle controller based, in whole or in part, on the fault type and current vehicle speed, a first torque limit for the first DU and a second torque limit for the second DU; and commanding, via the vehicle controller (e.g., via one or more command signals transmitted to the MCP), a first torque output of the first DU be constrained to the first torque limit and a second torque output of the second DU be constrained to the second torque limit.

Additional aspects of this disclosure are directed to closed-loop feedback control systems and intelligent motor vehicles provisioning fault management and mitigation for DIDU axles. As used herein, the terms "vehicle" and "motor vehicle" may be used interchangeably and synonymously to include any relevant vehicle platform, such as passenger vehicles (REV, FEV, BEV, fully and partially autonomous, etc.), commercial vehicles, industrial vehicles, tracked vehicles, off-road and all-terrain vehicles (ATV), farm equipment, etc. In an example, a motor vehicle includes a vehicle body with a passenger compartment, multiple road wheels mounted to the vehicle body, and other standard original equipment. For electric-drive vehicle applications, multiple electric drive units operate alone (e.g., for FEV powertrains) or in conjunction with an internal combustion engine assembly (e.g., for HEV powertrains) to selectively drive multiple vehicle road wheels to thereby propel the motor vehicle.

Continuing with the discussion of the above example, the vehicle includes a DIDU axle that is operatively mounted to the vehicle body and includes first and second DUs that are independently operable to drive first and second road wheels, respectively, and first and second axle shafts that drivingly connect the first and second DUs to the first and second road wheels, respectively. Another drive axle is operatively mounted to the vehicle body and includes one or more prime movers (ICE or MGU) that is/are independently operable to drive a second pair of road wheels. A resident or remote vehicle controller (e.g., electronic control unit, control module, or network of controllers/modules) receives a fault signal from a fault sensing module indicating a fault condition in the first DU of the DIDU axle. The controller responsively determines a fault type for the fault condition and a current speed of the motor vehicle. The controller then derives a respective torque limit for each DU based, in whole or in part, on the fault type and current vehicle speed. Torque output of the first DU is concomitantly constrained to a first torque limit while torque output of the second DU is constrained to a second torque limit.

For any of the disclosed systems, methods, and vehicles, determining a torque limit for the faulted (first) DU may include: determining if the fault type is any one of multiple predefined hardware or communications faults; in response to the fault type not being one of the predefined HW/comms faults, setting a torque limit for the faulted DU to zero or near zero; and, in response to the fault type being one of the predefined HW/comms faults, setting a torque limit for the faulted DU to an estimated achievable torque value predicted for the fault type. Contemporaneous with constraining the torque outputs of the faulted and non-faulted DUs to their respective torque limits, a maximum speed limit for the motor vehicle may be restricted to a base motor speed of an electric traction motor in the faulted DU. Contemporaneous with restricting the vehicle's overall speed limit to the base motor speed and constraining the torque outputs of the DUs, the vehicle controller may activate the vehicle's electronic stability control system and employ the ESC system to regulate a predetermined set of vehicle dynamics parameters to mitigate or prevent gross unstable conditions (e.g., measured vehicle yaw rate>>driver-derived yaw rate) during driving of the motor vehicle. In this instance, the ESC system may apply one or more friction brakes at different corners of the motor vehicle to counteract gross unstable conditions (e.g., offset excessive yaw rate).

For any of the disclosed systems, methods, and vehicles, upon detection of a fault condition on one of the vehicle axles, the vehicle controller may actively confirm that the fault condition is a HW/comms fault on the DIDU axle and not a detected fault associated with the other axle. As yet a further option, the vehicle controller may determine if the vehicle's current speed exceeds a predefined yaw destabilization speed at which active lateral dynamics control is enabled. If so, the torque limit constraints on the non-faulted DU are removed such that the non-faulted DU may operate at full torque capacity. This may allow the opposing drive unit to help counteract undesired lateral motion. If, however, the vehicle's current speed does not exceed the predefined yaw destabilization speed, the vehicle controller may responsively determine if a current driving mode of the motor vehicle is any one of multiple predefined driving modes that implement multi-axle driving capabilities (e.g., off-road mode, high-trac mode, etc.). If not, the second DU may be disabled since multi-axle driving is not desired. Conversely, if the current driving mode is one of the predefined driving modes, the controller may determine if the current vehicle speed is less than a maximum limp speed associated with a vehicle limp mode; if it is not, the second DU is disabled and, if it is, the torque limit constraint on the non-faulted DU is removed so that this DU may operate at full torque capacity.

For any of the disclosed systems, methods, and vehicles, in response to the vehicle's current speed exceeding the predefined yaw destabilization speed, a propulsion actuator may be employed to govern lateral dynamics behavior of the motor vehicle. For instance, the non-faulted (second) DU may be commanded to apply a negative (brake) torque to the second road wheel via the second axle shaft to induce a yaw-error offset in response to a yaw error towards the faulted (first) DU exceeding a first maximum yaw error value. As yet a further option, the non-faulted (second) DU may be commanded to apply a positive (acceleration) torque to the second road wheel via the second axle shaft to induce a yaw-error offset in response to a yaw error towards the non-faulted (second) DU exceeding a second maximum yaw error value.

For any of the disclosed systems, methods, and vehicles, the vehicle controller may include a discrete vehicle motion controller, whereas the fault sensing module may include a discrete motor process controller that communicates with the VMC and one or more electronic sensing devices. In this instance, the electronic sensing device(s) may monitor a back electromotive force (EMF) induced by one or both DUs across a high-voltage (HV) electrical bus connecting the DUs to a traction battery pack. The MCP detects a fault condition in response to a back-EMF induced on the HV electrical bus exceeding a dc-link voltage threshold. Responsive to detecting the fault condition, the MCP transmits one or more fault signals to the VMC. The fault type may be a hardware or communications fault that causes a DU to operate in an uncontrolled generation (UCG) mode during which the faulted DU uncontrollably generates electric power that is transferred across the HV electrical bus to the HV traction battery pack.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
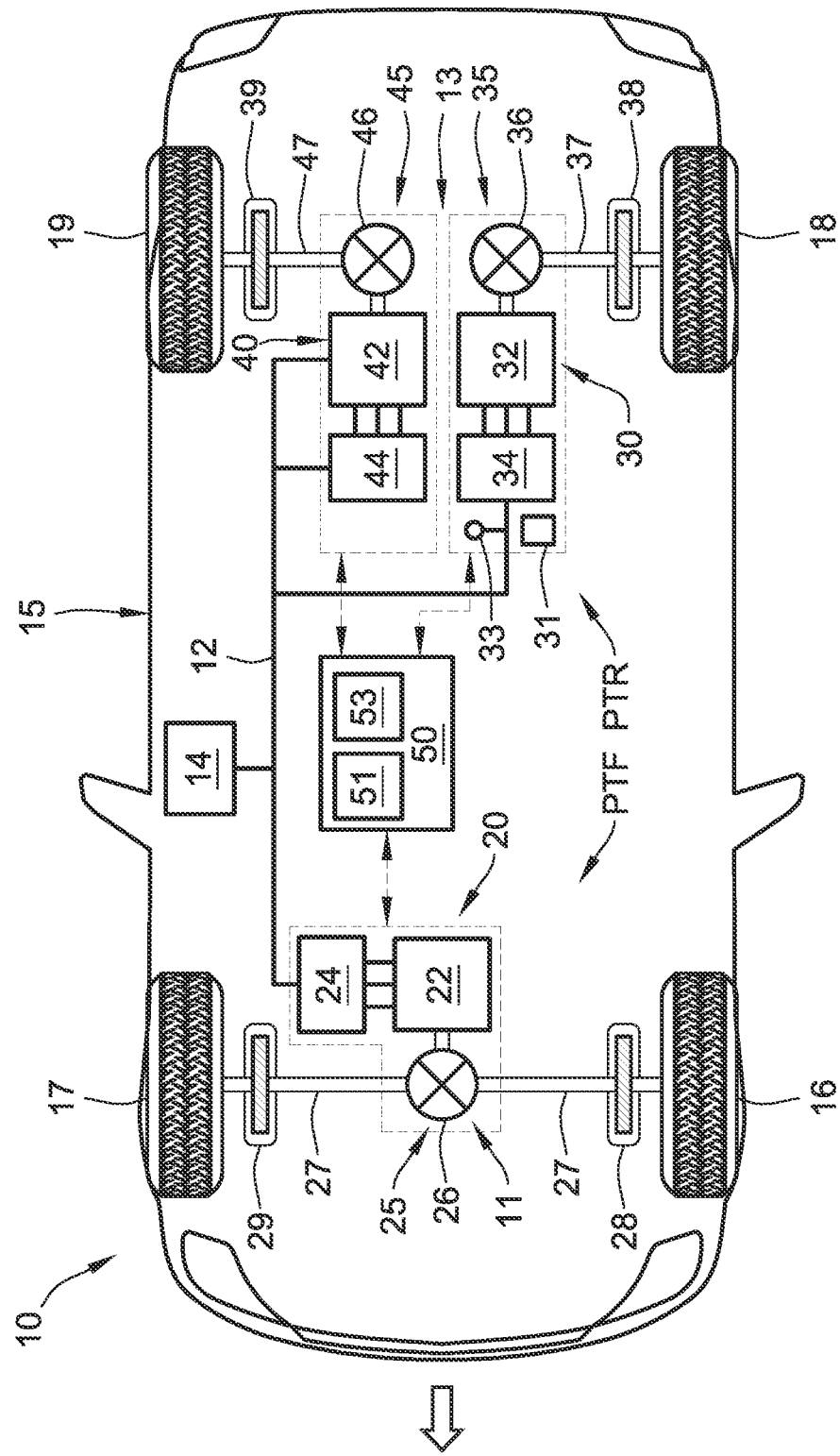
FIG. 1 is a schematic illustration of a representative electric-drive vehicle with a front-and-rear independent drive (FRID) powertrain with a dual-independent drive unit (DIDU) rear axle configuration according to aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into a full-electric AWD powertrain should also be appreciated as a non-limiting implementation of disclosed features. As such, it will be understood that aspects and features of this disclosure may be applied to other FEV and HEV powertrain architectures, may be utilized for alternative drivetrain layouts, and may be implemented for any logically relevant type of vehicle. Moreover, only select components of the motor vehicles and vehicle control systems are shown and described in additional detail herein. Nevertheless, the vehicles and vehicle systems discussed below may include numerous additional and alternative features, and other available peripheral components, for carrying out the various methods and functions of this disclosure.

Electric-drive vehicle 10 of FIG. 1 is an example of a DIDU battery electric vehicle equipped with a multi-mode, FRID-type electrified powertrain that enables on-demand all-wheel drive capabilities by simultaneously transferring propulsion torque to multiple road wheels from three independently operable electrified drive units that employ electric machines as prime movers. The AWD BEV powertrain of automobile 10 is shown with a split-branch architecture: a front (first or primary) powertrain PTF branch at a forward end of the vehicle body 15 and a rear (second or auxiliary) powertrain PTR branch aft of the front powertrain PTF at a rearward end of the vehicle body 15. In this example, the front powertrain PTF may be typified by front (first) axle 11 for driving a front-left (front passenger-side) drive wheel 16 and a front-right (front driver-side) drive wheel 17. Likewise, the rear powertrain PTR may be typified by a rear (second) axle 13 driving a rear-left (rear passenger-side) wheel 18 and a rear-right (rear driver-side) wheel 19. While vehicle 10 of FIG. 1 is shown with a single DIDU axle on the rear axle 13, it should be appreciated that the electric-drive vehicle 10 may utilize multiple DIDU axles, a single DIDU axle on the front axle 11, three or more axles, etc. Disclosed features are similarly applicable to DIDU FWD vehicles and DIDU RWD vehicles with a single driven axle.

To propel the vehicle 10 during either FWD or AWD operating modes, a first prime mover, which may be in the nature of a front (primary) drive unit 20, generates tractive torque for driving both of the front drive wheels 16, 17. Packaged within the front drive unit 20 is an electric traction motor 22 that is mechanically coupled to the front left and right wheels 16, 17 via a front (first) driveline 25. In accord with the illustrated example, the front driveline 25 utilizes an integrated transmission, differential and axle (transaxle) unit 26 with independent half-shafts 27 for coupling the motor 22 to the wheels 16, 17. A front (first) power inverter module (PIM) 24 electrically connects the drive unit motor 22 to a rechargeable energy storage system (RESS) 14. For a fully integrated drive unit assembly, the motor, inverter, and transmission of a DU 20, 30, 40 are packaged as a unitary construction with internal cooling and high specific power capabilities.

Operation of the front drive unit 20 and associated PIM 24 is provisioned by a resident vehicle controller 50, which may include any one or more of a Powertrain Control Module (PCM), an Advanced Driver Assistance System (ADAS) module, an Electronic Battery Control Module (EBCM), a Brake System Control Module (BSCM), etc. Front-left and front-right (disc, drum, or air) friction brakes 28 and 29, respectively, are selectively engaged to decelerate the front-left and front-right drive wheels 16, 17 in response to a braking command, e.g., from BSCM of vehicle controller 50. A high-voltage electrical bus 12 couples the vehicle's three drive units 20, 30, 40 to the RESS 14. In at least some implementations, the RESS 14 is configured as a multi-cell lithium-ion device capable of charging and discharging under a range of conditions. Although portrayed with a single prime mover in the nature of a traction motor, the front powertrain PTF may employ multiple traction motors, an internal combustion engine, or a hybrid combination of an engine and a motor.

To propel the vehicle 10 during either AWD or, if available, RWD operating modes, second and third prime movers, which may be in the nature of a left-rear (first auxiliary) drive unit 30 and a right-rear (second auxiliary) drive unit 40, generate tractive torque for independently driving the rear drive wheels 18, 19. Packaged within the left-rear drive unit 30 is first auxiliary electric traction motor 32 that is mechanically coupled to the rear-left wheel 18 via a rear-left (passenger-side) driveline 35. In the same vein, a second auxiliary electric traction motor 42 is packaged within the right-rear drive unit 40 and mechanically coupled to the rear-right wheel 19 via a rear-right (driver-side) driveline 45. The rear-left driveline 35 utilizes an independent differential unit 36 and dedicated rear half-shaft 37 for coupling the motor 32 to the rear-left drive wheel 18. Likewise, the rear-right driveline 45 utilizes its own independent differential unit 46 and dedicated rear half-shaft 47 for coupling the motor 42 to the rear-right drive wheel 19. For at least some desired applications, each traction motor 22, 32, 42 is a polyphase AC permanent magnet (PM) motor generator unit (MGU).

A rear-left (second) power inverter module 34 electrically connects the rear-left drive unit motor 32 to the RESS 14 via bus 12, and a rear-right (third) power inverter module 44 electrically connects the rear-right drive unit motor 42 to the RESS 14 via bus 12. Independent operation of the rear drive units 30, 40 and their respective PIMs 34, 44 may also be provisioned by the resident vehicle controller 50. Each PIM 24, 34, 44 is an element of the DU power electronics control (PEC) subsystem that regulates transmission of electrical energy to and from the traction motors 22, 32, 42 and, when desired, converts high-voltage direct current (DC) power into three-phase alternating current (AC) power, and vice versa, as needed. A traction PIM may include a set of power inverters, high-speed transistors, and capacitor-based filters along with motor control hardware to receive motor control commands for providing motor drive and regeneration functionality. Rear-left and rear-right friction brakes 38 and 39, respectively, are selectively engaged to decelerate the rear-left and rear-right wheels 18, 19 in response to associated braking commands, e.g., from vehicle controller 50.

RESS 14 is adapted for storing and supplying high-voltage electrical energy used for propelling the electric-drive vehicle 10 of FIG. 1. This RESS may be a deep-cycle, high-ampere capacity battery system rated for approximately 350 to 800 VDC or more, for example, depending on a desired vehicle range, gross vehicle weight, and power ratings of the various accessory loads drawing electrical power from the RESS. To this end, the RESS may employ one or more high-voltage, high-energy-density battery packs that electrically connect to the drive unit motors. A traction battery pack is generally composed of an array of lithium-ion rechargeable (secondary) battery modules. These battery modules may be arranged in a pattern of rows and columns and may be buttressed on a battery support tray or packaged inside a battery pack housing. Aspects of the disclosed concepts may be similarly applicable to other electric storage unit architectures, including those employing nickel metal hydride (NiMH) batteries, lead acid batteries, lithium polymer batteries, or other applicable type of rechargeable electric vehicle battery (EVB). Each battery module may include a series of electrochemical battery cells, such as stacked pouch-type lithium ion (Li-ion) or Li-ion polymer battery cells, for example.

As indicated above, vehicle controller 50 is constructed and programmed to govern select operations of the motor vehicle 10, including control of the components illustrated in FIG. 1. Control module, module, controller, control unit, electronic control unit, processor, microprocessor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s), semiconductor IC devices), input/output circuit(s) and devices, appropriate signal conditioning and buffer circuitry, and other components, such as a high-speed clock 53, to provide the described functionality, etc. Associated storage and memory 51 (e.g., read only, programmable read only, random access, hard drive, tangible, etc.), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The vehicle controller 50 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

During operation of the electric-drive vehicle 10, the AWD BEV powertrain may experience a fault condition that renders one or more of the drive units 20, 30, 40 inoperable or ineffectual. By way of illustration, one of the drive units 30, 40 on the rear DIDU axle 13 may experience an uncontrolled generation (UCG) fault resulting from magnetic induction of the traction motors 32, 42 inducing a counter (back) EMF on the HV electrical bus 12 that exceeds a dc-link voltage. A UCG fault condition may lead to the electric machine uncontrollably generating electric power that may be transferred across the HV bus 12 to in-vehicle battery modules of the RESS 14. Such an operating state may increase the likelihood of unwanted lithium plating on the battery cell electrodes, tabs, and busbar plates and may provoke an unintended vehicle deceleration event when the faulted DU is being operated to supply propulsion torque. On a vehicle with a DIDU axle employing multiple independently operable drive units for vehicle propulsion, a UCG fault in one of the traction motors may result in unintended lateral motion (ULM) of the vehicle.

On a BEV application with two independent drive units on a single axle, if a fault develops with one of the drive units, such as a motor winding/cage fault, half-shaft failure fault, PIM gate fault, etc., the vehicle may lose lateral stability due to unintended left-right torque vectoring. Discussed below is a control strategy to provision a system-automated fault response for managing and minimizing undesired vehicle dynamics while concurrently maximizing system availability to preclude vehicle immobilization. Five powertrain system control actions may be taken in tandem to manage and mitigate a detected fault condition: set axle torque limits at faulted DU; set axle torque limits at non-faulted DU or DUs; impose vehicle speed limits; modulate VMC control priorities; enable electronic stability control. For instance, torque limits for the faulted DU may be clamped to an estimated "achievable" torque value or range to ensure vehicle motion control is able to predict the resulting vehicle dynamics from the failure. When a motor fault occurs, torque may no longer be controllable; the faulted motor may produce torque based on the operating conditions and fault action taken by the supervising control system. For motor control to comprehend the situation and take the appropriate action, the MCP may calculate a best estimate of the torque the faulted motor is producing ("achieving") at the present operating conditions, and may clamps both the maximum and minimum motor torque limits—normally representing a controllable and achievable torque range—to the present estimated faulted motor torque.

Torque limits for the opposing non-faulted DU may be clamped to zero or a predefined limit, e.g., depending on the current driving mode, vehicle speed, fault type, etc. A maximum vehicle speed limit may be enforced, e.g., as a function of vehicle driving mode and fault type to prevent the vehicle from entering into a precarious condition. VMC control calibration values can be modified to prioritize or de-prioritize lateral vehicle motion objectives, e.g., depending on driving mode and fault type. If disabled, electronic stability control or other ADAS automated system may be reactivated depending, for example, on fault type and vehicle driving mode.

Figure 2:
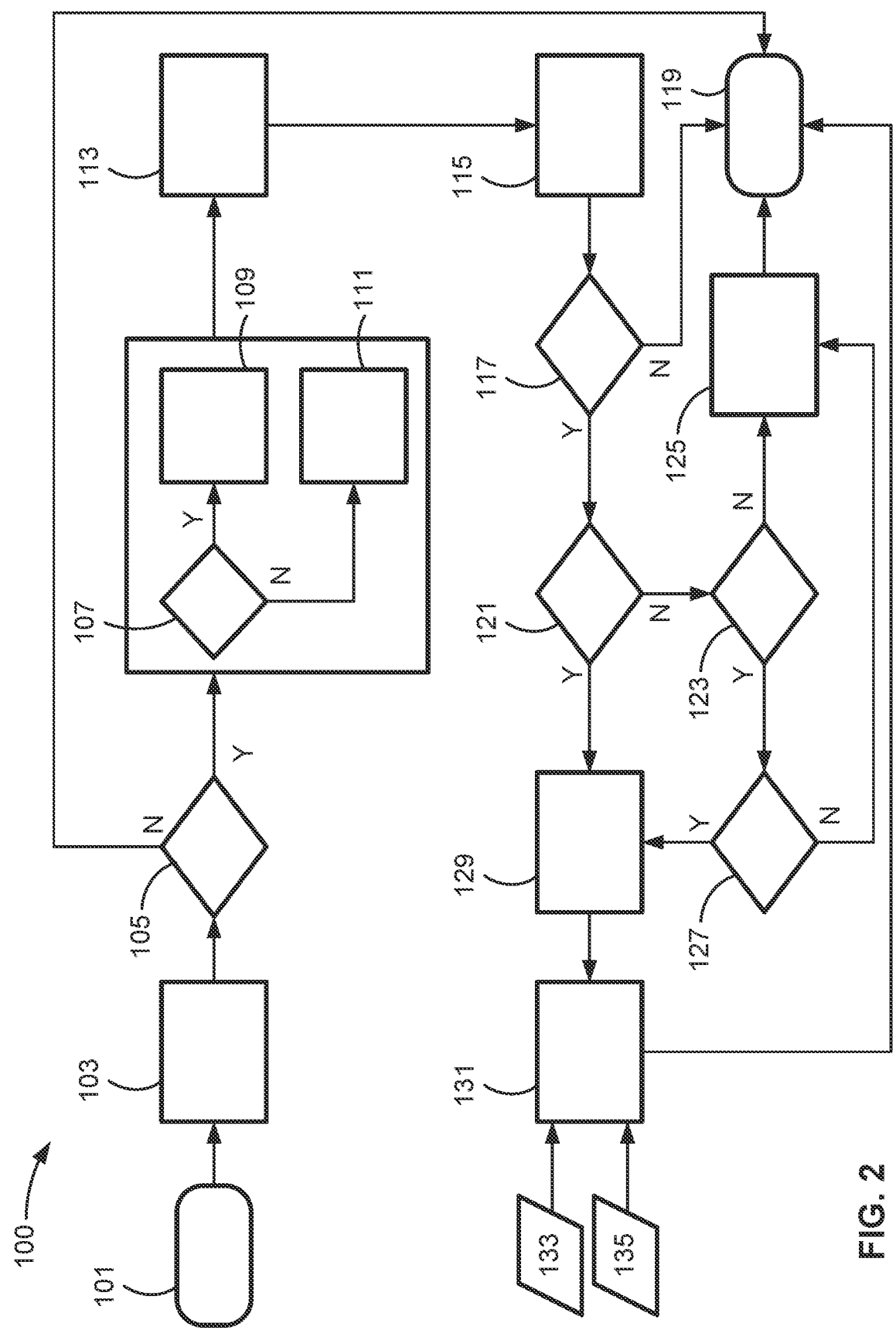
FIG. 2 is a flowchart illustrating a representative fault management and mitigation control protocol for operating a DIDU axle of an electric-drive vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for performing fault management and mitigation for a DIDU axle, such as rear axle 13 of FIG. 1, of a motor vehicle, such as electric-drive vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 51 of FIG. 1), and executed, for example, by an electronic controller, processing unit, logic circuit, or other module or device or network of modules/devices (e.g., controller 50 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at terminal block 101 with memory-stored, processor-executable instructions for a programmable controller or control module or similarly suitable processor to call up an initialization procedure for a fault management control protocol. This routine may be executed in real-time, continuously, systematically, sporadically and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., a host cloud computing service). Upon completion of the control operations presented in FIG. 2, the method 100 may advance to terminal block 119 and temporarily terminate or, optionally, may loop back to terminal block 101 and run in a continuous loop.

Advancing from terminal block 101, the method 100 detects an axle/drive unit fault at process block 103 and, upon detection of a fault, ascertains which type of fault has occurred at decision block 105. As explained above, a UCG condition may occur when a three-phase PM motor's back-EMF is higher than the HV DC bus voltage. A motor control processor (MCP) 31 resident to the left-rear auxiliary drive unit 30, for example, may prompt a bus-side electronic voltage sensor 33 to monitor voltage output, including back-EMF, from motor 32 to HV bus 12. When the auxiliary electric traction motor 32 is operating at a high rotational speed and working as a generator, an unrestrained feed of motor-generated electric power may transmit back towards the RESS 14. As DC power is generated in this UCG mode, the motor 32 of the now faulty drive unit 30 may start to generate a motor-speed-and-characteristic dependent braking torque on the drive wheel 18. A UCG mode may be caused by a defect in the motor 32, an MCP 31 processor fault, or a PIM 34 inverter gate driver fault. As such, a UCG fault may be flagged when the back-EMF is higher than the DC bus voltage as well as by monitoring hardware and communications failures that would cause a loss of motor control. If the detected fault is not one within a set of predetermined axle hardware or communications (HW/comms) faults (Block 105=NO) that each triggers DIDU fault management, method 100 may temporarily conclude at terminal block 119.

After confirming that the detected fault is an axle HW/comms fault that triggers DIDU fault management (Block 105=YES), method 100 provisions logic to set maximum and minimum torque limits for the failed drive unit. In FIG. 2, method 100 continues to decision block 107 to determine if the fault type is one that effects UCG of back-EMF. In reaction to the detected fault being, say, a motor position sensor fault or a PIM inverter gate fault causing a UCG condition (Block 107=YES), a faulted (first) motor torque limit or torque limit range for the traction motor 32 of the faulted (first rear) drive unit 30 is set to an estimated achievable torque value or torque range that is predicted for the associated fault type, as indicated at process block 109. As a non-limiting example, a benchtop hardware-in-loop (HIL) emulator may forecast a maximum and a minimum achievable torque at which the faulted DU motor may operate in a faulted state without causing sufficient back-EMF to perpetuate a UCG condition. The VMC may utilize a chassis model of the subject vehicle within its control function to predict the vehicle's dynamic response with the understanding of the failure torque being produced at the affected corner. If, however, the detected fault is not a fault type that causes unrestrained torque production (e.g., UCG of back-EMF), such as a half-shaft or differential HW failure, the faulted (first) motor torque limit is set to zero (0) or near zero, as indicated at process block 111.

Contemporaneous with constraining the torque outputs of the DIDU rear axle 13 drive units 30, 40, the method 100 executes process block 113 and sets a maximum vehicle speed limit at which the motor vehicle may travel under fault conditions to a motor-calibrated base speed of the traction motor 32 in the faulted drive unit 30. A motor's base speed may be the "nameplate rated" onset speed at which the terminal voltage of the motor becomes the rated voltage. Base motor speed may be the maximum rotor speed at which the motor can operate under constant torque characteristics or the minimum rotor speed to operate at rated power. Another possibility for such speed selection is a motor speed in which the motor may be free-spun without creating uncontrolled torque or without causing component damage.

In addition to restricting the vehicle's overall speed limit and constraining the DIDU drive units' torque outputs, the method 100 advances to process block 115, activates the vehicle's electronic stability control system, and employs ESC actuators to control a predetermined set of vehicle dynamics parameters in order to mitigate or prevent gross unstable conditions during driving of the faulted vehicle. A "gross unstable condition" may be defined as a dynamic driving condition in which an actual (measurable) yaw rate of a vehicle is significantly different from a desired (driver-commanded) yaw rate. A simplified example would be a driver holding the steering wheel steady to navigate the vehicle along a substantially straight path down a roadway, effectively inputting a desired vehicle yaw rate of zero. However, a failure occurring in one of the rear DUs 30, 40 may engender an inadvertent brake torque that causes the vehicle body 15 to yaw in a clockwise direction (counterclockwise in FIG. 1). To mitigate this gross unstable condition, the ESC system may selectively apply and/or modulate one or more of the friction brakes 28, 29, 38, 39 to help counteract the attendant yaw rate. The ESC system may be operable to output friction brake commands to individual wheels and to all wheels of the vehicle.

With continuing reference to FIG. 2, the method 100 executes decision block 117 to confirm that the fault condition is a HW/comms fault on a DIDU axle (e.g., rear axle 13) and not a detected fault associated with another available drive axle(s) (e.g., front axle 11). Decision block 117 may function as a precautionary evaluation to ensure DIDU fault management and mitigation is only performed during predefined DIDU fault conditions. To that end, decision block 117 may be performed prior to or concurrent with block 103 or block 105 to preemptively terminate the method 100 before performing superfluous operations. In response to a determination that the failure is not on a DIDU axle (Block 117=NO), method 100 proceeds to terminal block 119 and either terminates, loops back to terminal block 101, or proceeds to an alternative fault management protocol for non-DIDU related faults. For example, a vehicle may have two driven axles (e.g., an FRID architecture) without dual independent drive units on either axle. If one axle is faulted, torque limits may be implemented for the faulted motor, max/min speed restrictions may be enforced for the vehicle, and ESC may be enabled for active vehicle dynamics control. Additionally, the vehicle may implement a single axle limp home mode.

After confirming that the failure occurred on an axle with dual-independent drive units (Block 117=YES), method 100 proceeds to decision block 121 and determines if the vehicle's current speed exceeds a predefined yaw destabilization speed at which active lateral dynamics control is enabled or desired. During forward driving of the automobile 10 of FIG. 1, for example, the real-time vehicle speed may be relatively slow (e.g., below 30-35 mph) such that any inadvertent brake torque applied by the faulted DU 30 will not drastically magnify vehicle yaw. Conversely, when the vehicle's real-time speed surpasses a predefined yaw destabilization speed (e.g., 40+ mph), a UCG fault condition may generate a large braking torque at the faulted axle half that would necessitate actively compensated dynamics to achieve yaw rate control. Real-time or near real-time vehicle speed may be ascertained by any available means, including variable reluctance (passive) and magneto resistive (active) wheel speed sensors (WSS). For some implementations, after the vehicle speed is brought down to a speed that is below the predefined yaw destabilization speed, method 100 may responsively disable the entire rear axle 13 such that the automobile 10 operates as a single-axle FWD vehicle. A reason for disabling the non-faulted "good" drive unit in this instance is to ensure this drive unit is not operating at full capacity, which may cause the vehicle to "feel more agile" on one side of the vehicle versus the other. This potential imbalance of the vehicle may not be desirable except in a specific situation as required by a driver-selected driving mode.

Responsive to a determination that the vehicle's current speed is below the predefined yaw destabilization speed (Block 121=NO), method 100 executes decision block 123 to determine if a current driving mode of the motor vehicle is any one of multiple predefined multi-axle driving modes that implement the AWD driving capabilities of the motor vehicle 10. In a representative example, the resident vehicle controller 50 may ascertain whether or not the vehicle is in an off-road "terrain" mode or in a high-traction "low-mu" mode. In direct response to a determination that the vehicle is not operating in any of the multi-axle driving modes (Block 123=NO), method 100 may execute process block 125 and set a non-faulted (second) motor torque limit or torque limit range for the traction motor 42 of the non-faulted (second rear) drive unit 40 to zero. In doing so, the "good" drive unit 40 is effectively disabled since torque output via the rear axle 13 is not deemed necessary at the time.

Upon determining that the subject vehicle is currently operating in one of the available multi-axle driving modes (Block 123=YES), method 100 executes decision block 127 to determine if the vehicle's current speed is less than a limp-mode maximum speed. A "limp mode" is most commonly an On-Board Diagnostic (OBD) system feature that activates upon detection of a critical motor or axle fault to prevent further damage to the vehicle powertrain. Once triggered, limp mode typically restricts engine output, limits vehicle speed (e.g., 35 mph or 40 mph max), and may even disable all non-critical accessories (e.g., HVAC and radio use) and prevent the transmission from shifting gears. If the vehicle's current speed is above the limp mode's restricted maximum speed (Block 127=NO), method 100 may execute process block 125 and disable the non-faulted (second rear) drive unit 40.

Responsive to a determination that the vehicle's current speed is less than the limp-mode maximum speed (Block 127=YES), the method 100 executes process block 129 and removes any torque limit constrains on the non-faulted (second rear) drive unit 40 such that the "good" DU on the "good" axle shaft half may operate at full torque capacity. Likewise, if the vehicle is operating in a multi-axle driving mode (Block 123=YES) and the current vehicle speed is less than the limp-mode maximum speed (Block 127=YES), the method 100 executes process block 129 and removes any torque limit constrains on the non-faulted (second rear) drive unit 40. In both of the foregoing scenarios, the vehicle controller 50 may conclude that torque output is needed from the front axle 11 and the rear axle 13. Enabling the non-faulted DU of the DIDU axle to operate with the faulted DU disabled may involve vehicle propulsion in an asymmetrical way; this capability may be limited to a predefined low speed and, thus, disabled at higher vehicle speeds. As yet a further option, for a vehicle DIDU powertrain layout with a single driven axle, a special "asymmetric" limp mode may be implemented that enables the non-faulted "good" drive unit to run with limited torque output at a predefined low vehicle speed. The special driving mode may be enabled irrespective of current vehicle speed and current driving mode.

In addition to regulating the torque outputs of the individual drive units, restricting the maximum speed of the vehicle, and implementing ESC to ameliorate gross unstable conditions, method 100 may execute process block 131 to employ one or more available propulsion actuators to govern lateral dynamics behavior of the subject vehicle. In order to perform lateral dynamics management, method 100 may first receive a desired (driver-input) yaw rate via data input block 133 and an actual (measured) yaw rate via data input block 135. A "propulsion actuator" may include any available controller-actuable powertrain device that is operable to manipulate vehicle dynamics control. For instance, the auxiliary electric traction motor 42 of the right-rear drive unit 40 may be commanded to apply a negative torque to the right-rear road wheel 19 via rear half-shaft 47 to induce a counteractive (first) "error offset" yaw in response to a yaw error towards the first rear DU 30 exceeding a predefined (first) maximum yaw error value. Alternatively, the auxiliary electric traction motor 42 may be controlled to apply a positive torque to the right-rear road wheel 19 to induce a counteractive (second) "error offset" yaw in response to a yaw error towards the second rear DU 40 exceeding a predefined (second) maximum yaw error value.

To regain control over and recover vehicle stability during a DIDU axle fault condition, the method 100 implements closed-loop control over the vehicle's lateral dynamics using cooperative output from the vehicle ESC and powertrain actuators that are dynamically controlled to correct for yaw rate deviations from a desired yaw rate. For smaller magnitude deviations, propulsion actuator control may have sufficient authority to offset undesired yaw deviations; consequently, ESC system assistance may be curtailed or paused. For gross mismatches between desired lateral motion and actual vehicle lateral motion, ESC system assistance is enabled to provision controller-automated friction brake activation at each corner of the vehicle. As yet a further option, ADAS-enabled steering automation, which may include driver override, may be employed to ensure reasonable steering input and control during yaw rate recovery. Provided in the following paragraphs are two specific, yet non-limiting, examples of DIDU axle fault management and mitigation in accord with at least some of the disclosed concepts.

In one example, an inverter open fault may result in an uncontrolled charge generation fault condition. If a traction motor on a DIDU axle fails in the manner while the vehicle is traveling at a high speed (e.g., >50 mph), the failed motor may produce a significant drag torque (e.g., −100 Nm) at the affected corner, which may cause an unsolicited yaw of the vehicle towards that corner. In this instance, minimum and maximum motor torque limits for the faulted motor are set to estimated max/min UCG torque created by the motor to allow the VMC to predict vehicle motion that would result from this fault condition. Yaw rate control within the VMC may adjust torque at the opposing axle to prevent undesired yaw. If the DU failure occurred at high speed, torque limits on the motor of the non-faulted DU on the opposing axle half may not be changed so that the VMC is able to utilize DU to help stabilize the vehicle. Once the vehicle's speed is forced lower by an imposed vehicle speed limit, the non-faulted DU on the opposing axle half may be shut off to disable the entire DIDU axle. At the same time, VMC calibration priority may be changed to emphasize lateral stability over meeting driver longitudinal acceleration. A maximum vehicle speed limit may be imposed in order to reduce the vehicle speed to where UCG torque is deemed negligible and to prevent the vehicle from ascending back into a high UCG torque region. An ESC system re-enable prompt is requested if the current driving mode allows ESC to be deactivated by the driver.

In another example, one of the half-shafts on a DIDU axle may break or be otherwise rendered disabled while the subject vehicle is being operated in an off-roading "Terrain Mode". In this case, the fault management and mitigation protocol may try to maximize torque usage on the available axle/axle halves to prevent incapacitation of the subject vehicle. The faulted DU with the broken axle half-shaft may be shut down and the corresponding max/min torque capabilities thereof may be set to zero. If the current driving mode is one that necessitates multi-axle torque output (e.g., off-road mode, high-trac, etc.), axle torque limits for the opposing "good" axle/axle half may be ramped out as a function of vehicle speed and driving mode. At low vehicle speeds, for example, the non-faulted DU on the opposing axle half may be given full torque capabilities to ensure the vehicle can advance across rough or low-mu surfaces as needed. At high vehicle speeds, torque limits on the opposing "good" axle half may be set to zero to prevent left and right motion imbalance. As yet a further option, VMC calibration priorities may be changed to de-prioritize lateral motion at low vehicle speeds (e.g., <5 mph). In this instance, additional vehicle speed limitations may not be necessary since there are no UCG concerns (e.g., selected driving modes may have self-imposed speed limit restrictions). Additionally, ESC may be concurrently activated to help assist with lateral motion control.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with a dual-independent drive unit (DIDU) axle, the DIDU axle including a first drive unit (DU) and a second DU individually operable to independently drive first and second road wheels, respectively, the method comprising:
   receiving, via a vehicle controller from a fault sensing module, a fault signal indicating a fault condition in the first DU of the DIDU axle;
   determining, via the vehicle controller, a fault type for the fault condition;
   determining, via the vehicle controller, a current vehicle speed of the motor vehicle;
   determining, via the vehicle controller based on the fault type and the current vehicle speed, a first torque limit for the first DU and a second torque limit for the second DU; and
   commanding, via the vehicle controller, a first torque output of the first DU be constrained to the first torque limit and a second torque output of the second DU be constrained to the second torque limit.

2. The method of claim 1, wherein determining the first torque limit for the first DU of the DIDU axle operating in the fault condition includes:
   determining if the fault type is any one of multiple predefined hardware or communications (HW/comms) faults;
   setting the first torque limit to zero or near zero in response to the fault type not being one of the predefined HW/comms faults; and
   setting the first torque limit to an estimated achievable torque value corresponding to the fault type in response to the fault type being one of the predefined HW/comms faults.

3. The method of claim 1, further comprising, contemporaneous with constraining the first and second torque outputs of the first and second DUs, restricting a maximum vehicle speed limit of the motor vehicle to a base motor speed of an electric traction motor in the first DU.

4. The method of claim 3, further comprising, contemporaneous with restricting the maximum vehicle speed limit to the base motor speed and constraining the first and second torque outputs of the first and second DUs:
   activating an electronic stability control (ESC) system of the motor vehicle; and
   controlling, via the ESC system, a predetermined set of vehicle dynamics parameters to mitigate or prevent gross unstable conditions during driving of the motor vehicle.

5. The method of claim 1, wherein the vehicle includes a drive axle, distinct from the DIDU axle, independently driven by a prime mover, distinct from the first and second DUs, the method further comprising confirming the fault condition is a hardware or communications fault in the first DU of the DIDU axle and not a detected fault associated with the drive axle.

6. The method of claim 1, further comprising:
determining if the current vehicle speed of the motor vehicle exceeds a predefined yaw destabilization speed at which active lateral dynamics control is enabled; and
removing, in response to the current vehicle speed exceeding the predefined yaw destabilization speed, the second torque limit constraining the second DU.

7. The method of claim 6, further comprising, in response to the current vehicle speed not exceeding the predefined yaw destabilization speed:
determining if a current driving mode of the motor vehicle is any one of multiple predefined driving modes implementing multi-axle driving capabilities of the motor vehicle; and
disabling the second DU in response to the current driving mode of the motor vehicle not being one of the predefined driving modes.

8. The method of claim 7, further comprising, in response to the current driving mode of the motor vehicle being one of the predefined driving modes:
determining if the current vehicle speed is less than a limp-mode maximum speed;
disabling the second DU in response to the current vehicle speed not being less than the limp-mode maximum speed; and
removing the second torque limit constraining the second DU in response to the current vehicle speed being less than the limp-mode maximum speed.

9. The method of claim 6, further comprising, in response to the current vehicle speed exceeding the predefined yaw destabilization speed, employing a propulsion actuator to govern a lateral dynamics behavior of the motor vehicle.

10. The method of claim 9, wherein employing the propulsion actuator to govern the lateral dynamics behavior of the motor vehicle includes commanding the second DU to apply a negative torque to the second road wheel via a respective axle shaft to induce a yaw-error offset in response to a yaw error towards the first DU exceeding a first maximum yaw error value.

11. The method of claim 9, wherein employing the propulsion actuator to govern the lateral dynamics behavior of the motor vehicle includes commanding the second DU to apply a positive torque to the second road wheel via the second axle shaft to induce a yaw-error offset in response to a yaw error towards the second DU exceeding a second maximum yaw error value.

12. The method of claim 1, wherein the vehicle controller includes a vehicle motion controller (VMC), wherein the fault sensing module includes a motor control processor (MCP) communicating with an electronic sensing device, and wherein receiving the fault signal includes:
monitoring, via the electronic sensing device, a back electromotive force (EMF) induced by the first DU across a high-voltage (HV) electrical bus connected to the first DU;
detecting, via the MCP, the fault condition in response to the back-EMF induced on the HV electrical bus exceeding a dc-link voltage threshold; and
transmitting, via the MCP to the VMC, the fault signal responsive to detecting the fault condition.

13. The method of claim 12, wherein the fault type is a hardware or communications (HW/comms) fault causing the first DU to operate in an uncontrolled generation (UCG) mode during which the first DU uncontrollably generates electric power that is transferred across the HV electrical bus to a high-voltage traction battery pack.

14. An electric-drive vehicle comprising:
a vehicle body with first and second pairs of road wheels;
a dual-independent drive unit (DIDU) axle mounted to the vehicle body and including first and second drive units (DU) individually operable to independently drive first and second road wheels, respectively, of the first pair of road wheels, and first and second axle half shafts drivingly connecting the first and second DUs to the first and second road wheels, respectively;
a drive axle mounted to the vehicle body fore or aft of the DIDU axle and including a prime mover independently operable to drive the second pair of road wheels; and
a vehicle controller programmed to:
receive, from a fault sensing module, a fault signal indicating a fault condition in the first DU of the DIDU axle;
determine a fault type for the fault condition;
determine a current vehicle speed of the electric-drive vehicle;
determine a first torque limit for the first DU and a second torque limit for the second DU based on the fault type and the current vehicle speed; and
constrain a first torque output of the first DU to the first torque limit and a second torque output of the second DU to the second torque limit.

15. The electric-drive vehicle of claim 14, wherein the vehicle controller determining the first torque limit for the first DU of the DIDU axle operating in the fault condition includes:
determining if the fault type is any one of multiple predefined hardware or communications (HW/comms) faults;
setting the first torque limit to zero or near zero in response to the fault type not being one of the predefined HW/comms faults; and
setting the first torque limit to an estimated achievable torque value corresponding to the fault type in response to the fault type being one of the predefined HW/comms faults.

16. The electric-drive vehicle of claim 14, wherein the vehicle controller is further programmed to, contemporaneous with constraining the first and second torque outputs of the first and second DUs, restrict a maximum vehicle speed limit of the electric-drive vehicle to a base motor speed of an electric traction motor in the first DU.

17. The electric-drive vehicle of claim 16, wherein the vehicle controller is further programmed to, contemporaneous with restricting the maximum vehicle speed limit to the base motor speed and constraining the first and second torque outputs of the first and second DUs:
activate an electronic stability control (ESC) system of the vehicle; and
control, via the ESC system, a predetermined set of vehicle dynamics parameters to mitigate or prevent gross unstable conditions during driving of the electric-drive vehicle.

18. The electric-drive vehicle of claim 14, wherein the vehicle controller is further programmed to:
determine if the current vehicle speed of the electric-drive vehicle exceeds a predefined yaw destabilization speed at which active lateral dynamics control is enabled; and
responsive to the current vehicle speed exceeding the predefined yaw destabilization speed, remove the second torque limit constraining the second DU.

19. The electric-drive vehicle of claim 18, wherein the vehicle controller is further programmed to, in response to the current vehicle speed not exceeding the predefined yaw destabilization speed:
- determine if a current driving mode of the motor vehicle is any one of multiple predefined driving modes implementing multi-axle driving capabilities of the vehicle; and
- disable the second DU in response to the current driving mode of the electric-drive vehicle not being one of the predefined driving modes.

20. The electric-drive vehicle of claim 19, wherein the vehicle controller is further programmed to, in response to the current driving mode of the electric-drive vehicle being one of the predefined driving modes:
- determine if the current vehicle speed is less than a limp-mode maximum speed;
- disable the second DU in response to the current vehicle speed not being less than the limp-mode maximum speed; and
- remove the second torque limit constraining the second DU in response to the current vehicle speed being less than the limp-mode maximum speed.

* * * * *